United States Patent [19]
Woyton

[11] Patent Number: 4,713,973
[45] Date of Patent: Dec. 22, 1987

[54] INDICATOR WITH STAGED DATA PROCESSING

[76] Inventor: Joseph T. Woyton, 106 Braddock Dr., Mauldin, S.C. 29662

[21] Appl. No.: 787,058

[22] Filed: Oct. 15, 1985

[51] Int. Cl.⁴ .......................... G01L 1/22; G01D 1/18
[52] U.S. Cl. .................................. 73/862.67; 73/769; 73/862.31; 73/862.53; 324/119; 324/133; 340/665
[58] Field of Search ........... 73/862.67, 862.31, 862.53, 73/862.54, 769, 770, 771; 340/665, 679, 680; 324/133, 119; 307/236

[56] References Cited

U.S. PATENT DOCUMENTS

| | | | |
|---|---|---|---|
| 3,076,901 | 2/1963 | Rubin et al. | 324/133 X |
| 3,617,878 | 11/1971 | Senour | 73/769 X |
| 3,918,539 | 11/1975 | Wise . | |
| 3,965,429 | 6/1976 | Roberts, III | 73/769 X |
| 4,068,138 | 1/1978 | Miyakawa et al. | 307/236 X |
| 4,310,060 | 1/1982 | Phillips, Jr. et al. . | |
| 4,641,089 | 2/1987 | Pearman et al. | 324/119 X |

FOREIGN PATENT DOCUMENTS

2118721 11/1983 United Kingdom ................... 73/769

OTHER PUBLICATIONS

M. V. Hastings, "Dual Polarity Voltmeter", Radio & Elect's Const'r., vol. 33, No. 9, May 1980, pp. 532–537.
Publication No. 285 10K Newport "Quanta Q2000X Controller", Sep., 1983.

Primary Examiner—Charles A. Ruehl
Attorney, Agent, or Firm—Dority & Manning

[57] ABSTRACT

An indicator apparatus has multiple stages to effectively handle data processing, particularly raw data from a mechanical load cell, such as those used to monitor loads in the mechanical workings of a torque arm reducer. Processing of such raw data is split into parallel operations relating to both signal level and signal polarity functions. This multi-staged approach enables increased precision as to both functions due to tailoring of the data inputs to different stages. Use of staged circuitry to effect the separated functions also readily permits the presence of an unobtrusive monitor level signal output. Combined with other features, a limit detector and alarm permits accurate provision of both a stable response to low frequency steady state mechanical data and to fast-acting high frequency transient/dynamic data contained therein. Indicated polarity changes signify alternating tension and compression in the mechanical couplings of a load cell.

21 Claims, 4 Drawing Figures

INDICATOR WITH STAGED DATA PROCESSING

BACKGROUND OF THE INVENTION

This invention concerns an apparatus for processing data, and in particular a multi-staged indicator for use as a strain gauge load cell indicator. The apparatus may be especially adapted for monitoring loads in the mechanical workings of a torque arm reducer.

Data from mechanical systems frequently concerns very low frequency information, i.e., below several Hertz, mixed in with much higher frequency transient signals and rapid overloads. Also, sudden polarity changes are not unusual, even at high signal level values.

Accurate monitoring of loads in mechanical systems requires an indicator having special characteristics and qualities to accomodate such data. In general, prior art indicator systems do not effectively exhibit such special attributes. Many prior art indicator systems act too fast to provide a stable indication of load values under fluctuating value and polarity load conditions. Limit detectors of such prior art devices which are too fast acting provide nuisance trip outs under even minor conditions of overload, and hence do not satisfactorily perform their assigned function.

In general, prior art devices simply do not effectively handle alternating (+) and (−) load polarities. In mechanical systems, such as those associated with torque arm reducers, alternating polarity changes in monitored loads are indicative of alternating compression and tension in the respective mechanical element which is being monitored. Therefore, the many vibrations which may occur typically in a mechanical system are manifested in detection signals as signal polarity changes.

In general, prior art indicator devices and systems which attempt to monitor such alternating compression and tension effectively in mechanical systems with conventional indicator devices usually fail. For example, failing conventional devices might inefficiently cause the indicated signal level to sweep through zero, as would a mechanical meter arm, to indicate a polarity change. Failure of such prior art devices may result from the above-mentioned problem that steady state mechanical data is of a relatively low frequency while the alternating polarity changes and transient signals which may accompany such mechanical data can be of relatively high frequency. The present invention is intended to recognize and overcome such problems and failures as associated with some prior art devices.

Prior art indicator devices also have other shortcomings which may lessen effective monitoring of mechanical load system data. For example, not only are limit detectors of conventional devices generally too fast acting to provide desirable trip out performance, but they frequently lack any convenient means for setting and reading out associated limit set points.

Normally, because conventional indicator devices do not generally utilize the staged data processing approach of the present invention, they cannot readily provide a high frequency monitor output for conveniently and accurately tracking dynamic and transient operating load information. Such information may occur simultaneous with and be mixed in with steady state load information, as discussed above. This invention can provide such a high frequency monitor level output by virtue of a multi-staged data processing feature.

One example of a conventional indicator system is the Newport Q2000X digital indicator/controller, produced by the Newport Electronics Corporation of Santa Ana, Calif. The Q2000X is a modular-type system digital indicator/controller. It has a plurality of motherboards, analog outputs, control outputs, signal conditioner inputs and the like from which to choose. Signal conditioner inputs C and S of the Q2000X system are, respectively, AC average voltage and strain-gauge inputs. These two options are mutually exclusive in the Newport digital indicator system.

Option C, the AC average voltage signal conditioner input, has a rated input range of 47 through 1000 Hertz. However, 47 Hertz is generally too high of a frequency to include raw steady-state and low frequency transient data from a mechanical load system, which inclusion is one specific concern of this invention.

Option S, the strain gauge input of the Newport system, has a two Hertz low pass two-pole active filter. However, again this is a relatively high cut-off frequency for steady-state mechanical data and generally tend to give fluctuating or unstable digital readings.

A further drawback of the Newport Q2000X system when applied to a mechanical data environment is that its analog output is also limited to two Hertz. An analog output frequency limited to two Hertz is too low of a cut-off frequency to give valid data for any dynamic or transient mechanical analysis.

Additional features of conventional systems, as exemplified by the Newport system, present other problems which are addressed and overcome by this invention. For example, the Newport system has a latchable alarm, but it generally does not lock onto a reading of the data value at the time of alarm activation for subsequent display. Furthermore, the RMS-DC input option of the Newport system does not have any type of polarity sign detector. Similarly, that same input option does not have any peak/average control of system time constants. Also, the alarm system of Newport is not an integrating type, and thus does not specifically reduce the number of nuisance trip outs. The typical conventional system as exemplified by Newport generally lacks such further features as limit by-pass, built-in resistor calibration for the sensor and optional trailing display selection.

Some other prior art also has inherent drawbacks, but differs from the Newport System. For example, the U.S. Pat. No. 4,310,060to Phillips, Jr. et al. discloses an apparatus for monitoring the blending of fibers by measuring with load cells the weight of fibers in a pan. An analog signal from a load cell is converted to a digital signal and then processed in a subtractor and a latch circuit. The latch circuit is triggered whenever the weigh pan is found to be full. A chart recorder records the filling cycle for the weigh pan, and an associated alarm is actuated if indicated weights fall outside permitted tolerances.

Another weighing system disclosed by Wise (U.S. Pat. No. 3,918,539) monitors weight signals to control the rate of feeding of material onto a weigh pan. The detected load cells may comprise either a strain gauge disposed so as to support the weigh pan, or a device for detecting the movement of an arm attached to a weigh pan.

SUMMARY OF THE INVENTION

This invention concerns a device which is especially suited to effectively handle both dynamic/transient and steady state mechanical load data which may be output by a conventional load cell such as a strain gauge. Processing of data is specialized by handling signal information in multiple stages. For example, a precision rectifier stage enables accurate uni-polarity tracking of an absolute voltage level output. A separate and distinct polarity detector stage monitors signals for potentially high frequency alternating polarity changes. These and other stages will be described more fully hereinbelow.

The present invention achieves the functions of both the C option and S option of the Newport system and more, even though such options are mutually exclusive in the Newport system. Moreoever, practice of the present invention also overcomes the problems associated above with the analog output limitations of the Newport system.

The present invention is disclosed in recognition of all of the foregoing noted problems and deficiencies of the conventional or prior art systems, as well as other such problems, and has a number of objects which include solution of such problems. The following list of objects are intended as exemplary, and not limiting.

One object of this invention is to provide a special system for data applications, particularly mechanical data applications, which is not too fast acting, thereby providing a stable indication of load value under fluctuating load conditions.

Another object is to provide a system capable of effectively handling alternating polarity data which is indicative of sudden alternations of compression and tension in mechanical elements.

Yet another exemplary object is the provision of a system having a separate high frequency monitor output to enable detection and recording of dynamic/transient load data while providing simultaneous display of steady state load data.

In addition to such objects and features, this invention provides a limit detector which is interactive with a capacitive feedback circuit to permit quick trip out response to large overloads while preventing nuisance trip outs due to minor overloads. Such a limit device also possesses signal "freeze" at the time of trip out, bypass of the limit value at startup (or other designated times), and setting and reading of limit values In a typical application, the present invention might be used with a mechanical system such as a load cell associated with a torque arm gear reducer. In such a system, gear box reaction forces are proportional to the torque load placed on the gear box. Restraining rods within the housing are used to measure this reaction force. A suitable load or force cell is inserted into the rod strings, or other elements of such restraining rods, to obtain an accurate indication of reducer mechanical load. The particular load cell may be of any conventional strain gauge type, or any other type of mechanical data producing sensor.

A typical exemplary apparatus in accordance with the present invention may include pre-amplifier means for receiving and amplifying data; rectifier means for rectifying the amplified data; meter means responsive to the rectified, amplified data for displaying an absolute signal level indication of such data; and a polarity indicator means responsive to the amplified data for displaying the polarity of such data.

BRIEF DESCRIPTION OF THE DRAWINGS

An enabling description of the present invention to one of ordinary skill in the art is set forth in the remaining portion of the specification, and is intended to be better understood when read in conjunction with the appended Figures, in which.

Like reference characters and elements used throughout the Figures and specification indicate the same or analogous elements.

DETAILED DESCRIPTION OF THE PREFERRED EMBODIMENT

Figure 1:
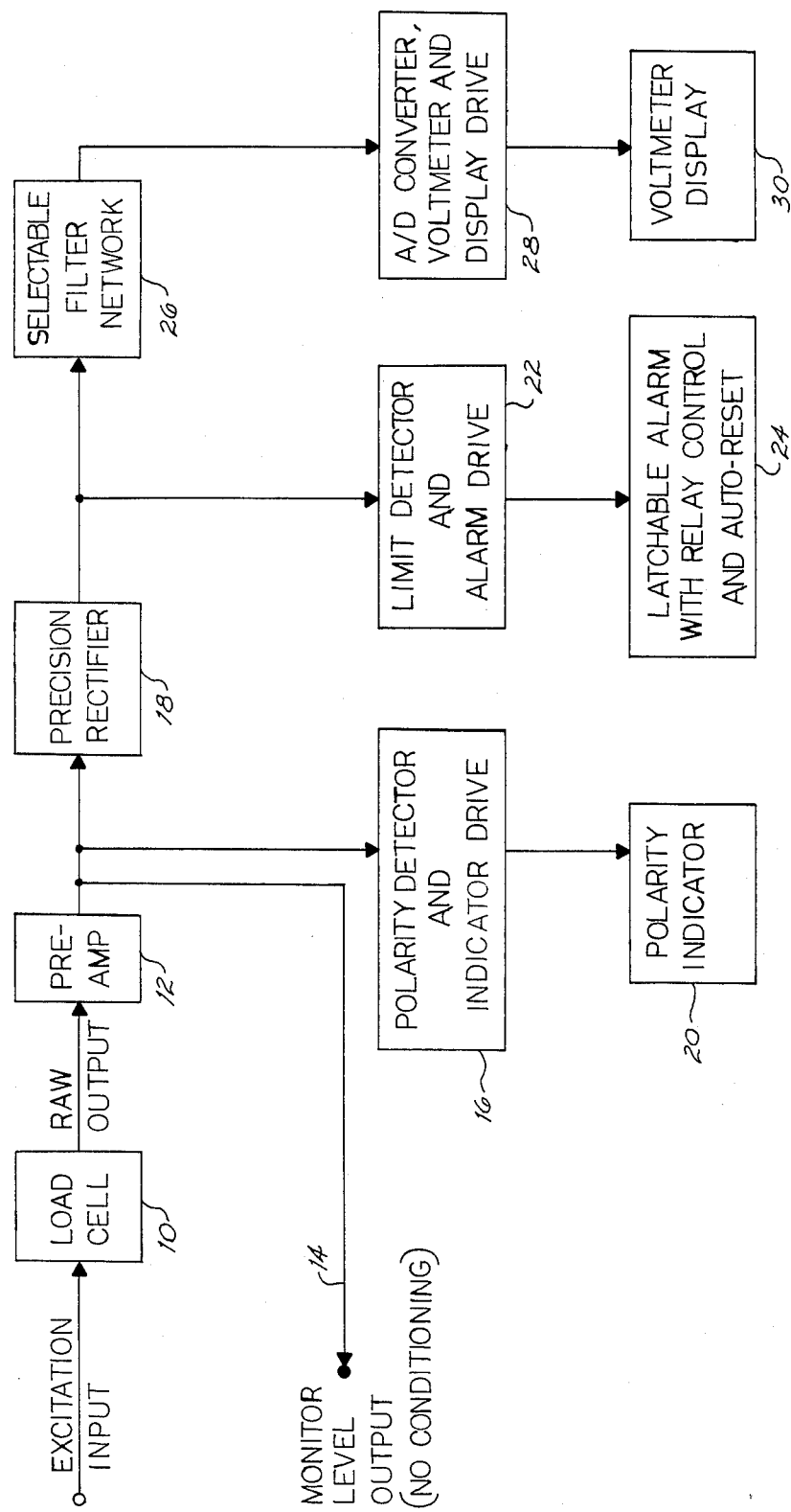
FIG. 1 illustrates a block diagram of one preferred embodiment of the present invention.

FIG. 1 illustrates a generalized block diagram form of an apparatus in accordance with the present invention. More specific details of this block diagram are illustrated and discussed below with regard to FIGS. 2 and 3.

Referring to FIG. 1, element 10 represents a conventional load cell, which may be of the type discussed above (i.e., a strain gauge associated with a torque arm reducer) or any other suitable type of load cell providing data, particularly data from a mechanical environment. As is well understood by one of ordinary skill in the art, conventional load cell 10 has an excitation input and an output for raw data. Raw data is data which is directly output from load cell 10 and which has not yet been functionally operated on by other stages of the overall apparatus.

The raw data output of load cell 10 is connected directly to an input of pre-amplifier means 12. Preamplifier means 12 constitutes, in essence, an amplifier stage of circuitry which follows the raw data acquisition stage of load cell 10, as is readily understood upon inspection of FIG. 1.

Pre-amplifier means 12 amplifies the raw data from load cell 10. Amplified raw data as output by preamplifier means 12 is subsequently provided to three different portions (i.e., stages) of the FIG. 1 block diagram.

Output 14 is one such stage and is a monitor level-type output. There is virtually no prior conditioning of the signal (amplified raw data) at output 14, with the exception of the amplification by pre-amplifier means 12 to ensure at least a minimum and hence useful signal level. Monitor level output 14 is a wideband output so that high frequency data such as transient or dynamic events in the raw data may be passed through output 14 to conventional devices for analysis. Output 14 provides an input to such devices for complete tracking and recording of transient/dynamic events.

Steady state data information is monitored directly by the present apparatus itself, as further explained below in conjunction with elements 18, 22, 28 and others. Hence, this invention enables detection of both transient/dynamic events and steady state data information by use of the multiple branch output of pre-amplifier 12. Such branching may be viewed as a form of parallel processing of raw data.

Parallel processing in another instance is also accomplished with other branches from pre-amplifier means 12. Elements 16 and 18 represent a polarity detector with indicator drive and a precision rectifier, respectively. Element 16 concerns polarity detection of the amplified raw data, while element 18 is essentially concerned with the accurate indication of an absolute value (i.e., unipolar) signal level of the amplified raw data.

Polarity detector 16 includes an indicator drive which outputs a driving input to polarity indicator 20. Polarity indicator 20 may be embodied as any number of conventional indicator systems for polarity, and may even include display of the terms "compression" and "tension", with automatic assignment of those terms respectively to positive or negative detected polarity.

An advantageous feature of parallel processing as it is embodied here is that at the same time polarity detector 16 is functioning in response to amplified raw data, precision rectifier 18 is also functioning in response to the same data. The output of precision rectifier 18 goes to several elements, including limit detector and alarm drive 22. Alarm drive 22 in turn powers the latchable alarm 24 which also includes relay control and auto-reset. The circuitry and major features of such a limit detector arrangement are discussed further below in greater detail.

Per a further multi-stage feature of this invention, even the output of precision rectifier means 18 is split into two paths for parallel processing of rectified, amplified data. In addition to limit detector and alarm drive 22 being responsive to the output of precision rectifier 18, selectable filter network 26 also is fed by the output from precision rectifier 18. Selectable filter network 26 operates in conjunction with the analog to digital converter, volt meter and display drive 28 to provide accurate unipolar tracking of the steady state value of mechanical loads included in the raw data output from load cell 10.

A volt meter display 30 is driven by converter, volt meter and display drive 28. Though indications of polarity and volt meter output are functionally segregated, volt meter display 30 and polarity indicator 20 as desired may be physically associated together in a single housing, as schematicaly illustrated in FIG. 3.

Figure 2:
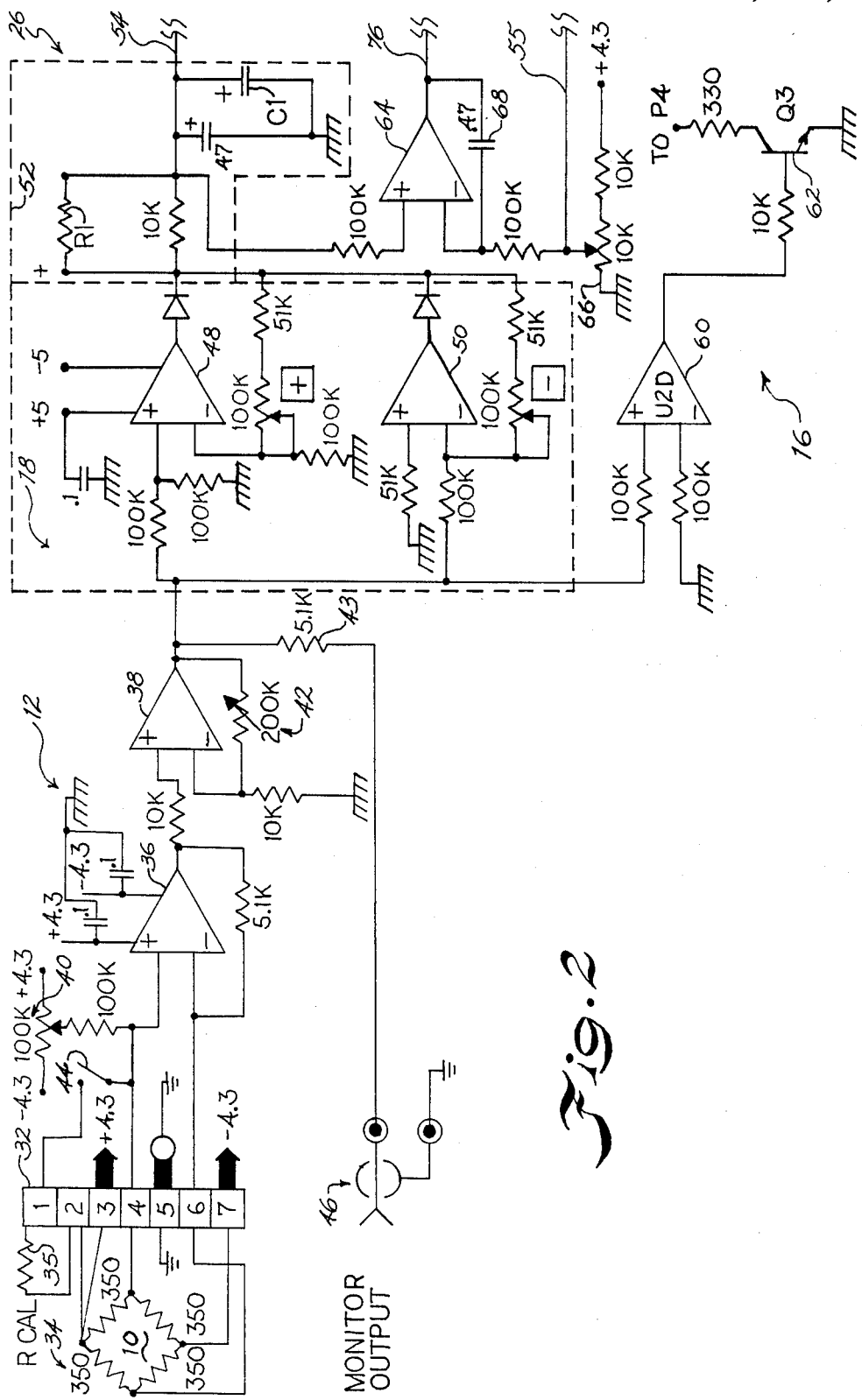
FIGS. 2 and 3 are partial figures which collectively illustrate exemplary circuitry for the block diagram of FIG. 1.
Figure 3:
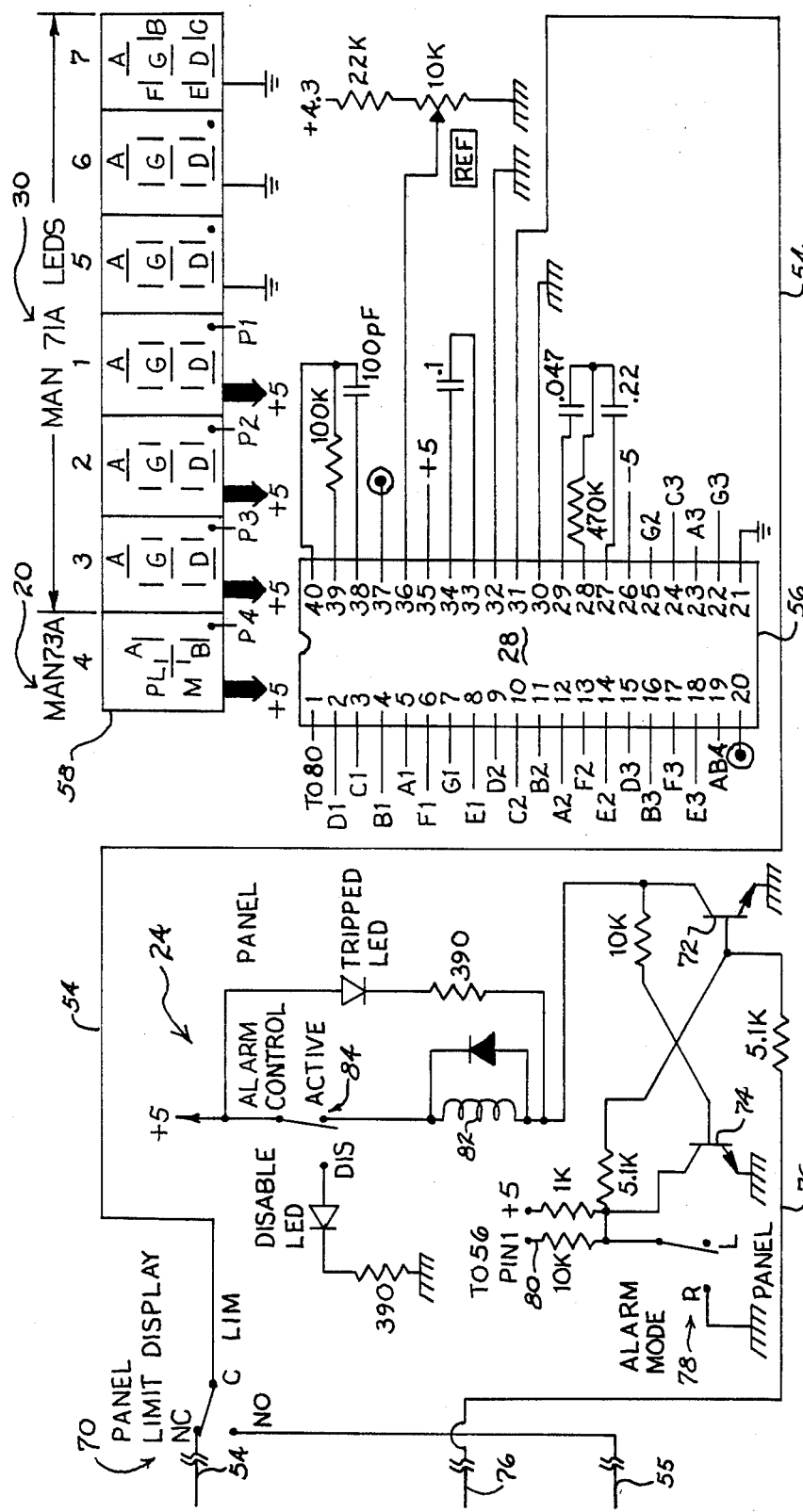

Operation of the FIG. 1 block diagram system in accordance with the present invention and further refinements thereof will be more fully understood when viewed in conjunction with the following discussion of FIGS. 2 and 3, which illustrate an exemplary embodiment of the FIG. 1 block diagram. Both FIGS. 2 and 3 are partial figures which may be joined at their right and left edges, respectively, to form a single exemplary circuit.

The exemplary embodiment of FIGS. 2 and 3 is particularly adapted for use with a load cell for use with a strain gauge application. Other applications, of course, fall within the broader scope of the invention. The resistor bridge circuit 34 is generally representative of a load cell. Excitation for the representative load cell (strain gauge) 34 is provided through pins 3 and 7 of the pin connector 32. This corresponds to the excitation input of load cell 10 of FIG. 1. The output of load cell 10 is proportional to the mechanical load in a given environment. Such a load signal is taken off from pins 4 and 6 of connector 32. The remaining wiring and biasing voltages of connector 32 are self-evident and self-explanatory from FIG. 2.

Exemplary values for the resistors of bridge circuit 34 and for other various resistors used throughout the embodiment are illustrated directly on the Figures. All such values are examples only, and are not in any way intended to be limiting per se to this invention.

The output taken off from pins 4 and 6 of connector 32 is fed to pre-amplifier means 12 which is comprised of operational amplifiers 36 and 38. These amplifiers merely provide amplification to boost the output signal from connector 32 to a usable signal level. Zero offset and gain of pre-amplifier stage 12 are adjustable in a conventional manner by appropriate selection of resistor/capacitor values, specifically with the setting of variable resistors 40 and 42, respectively. As an example of the amplification of this pre-amplification stage which may be useful, the gain of operational amplifier 36 may be set at about 29, and the gain of operational amplifier 38 variable from 1–50 for an overall gain of 29–1450 for the cascaded operational amplifiers 36 and 38.

Switch 44 functions in cooperation with resistor 35 as a built-in resistor calibration (RCAL) means. By appropriate actuation of switch 44, an imbalance in electrical bridge 34 is provided with RCAL resistor 35, which imbalance simulates a load signal. Such a simulated load signal is then used for calibration and set up of the indicator electronics. This particular RCAL feature is one of the further refinements of the FIG. 1 block diagram not specifically there illustrated, but alluded to above.

The signal input of second pre-amplifier operational amplifier 38 is derived from the output of first operational amplifier 36. The output of operational amplifier 38 corresponds to the output of pre-amplifier means 12. The pre-amplifier 12 output may be used as a monitor-level output which permits the monitoring of instantaneous load fluctuations and transients prior to any smoothing or other signal conditioning except preamplification. Element 46 illustrates a connection point for a monitor-level output derived from pre-amplifier 12 through a resistor 43. Such output may be fed to conventional fast-acting devices for monitoring causes of system vibration or other transient-type responses. Monitor output 46 has a relatively wide bandwidth to enable accurate tracking and evaluation of most transient events, which are ordinarily of much higher frequency (e.g., one order of magnitude or higher) than the steady state mechanical data which is also being monitored.

The amplified raw data from pre-amplifier 12 is also fed in parallel with monitor output 46 to operational amplifiers 48 and 50. Amplifiers 48 and 50 are connected in a known configuration to function as a precision rectifier means, such as illustrated in block diagram form by element 18 of FIG. 1. All signal polarities, whether (+) or (−), are converted to (+) only. The polarity indication feature of this invention is accomplished by operational amplifier 60 and other elements in parallel with the function of the precision rectifier means, as discussed in more detail below. Monitoring of real world events is thereby greatly simplified in that the actual reversing of loads e.g., alternating compression and tension, is accurately detected and indicated in the operational amplifier 60 branch while the signal level (or intensity) of such events is accurately monitored in a parallel branch by the precision rectifier arrangement of operational amplifiers 48 and 50.

The output of the precision rectifier means 18 of FIG. 1 (comprising operational amplifier 48 and 50) is fed to a selectable filter network 52 (enclosed in dotted lines in FIG. 2), as illustrated in block diagram form by elements 18 and 26 of FIG. 1. Filter network 52 smooths out any pulsating (+) DC signals to obtain a steady state load value (here, a voltage). The time constant of filter network 52 is selectable, as is known, by varying the values of resistor R1 and capacitor C1. Such variations in the filter network time constant permit filter 52 to selectively engage in a variety of functions from peak detecting to averaging.

The filtered load voltage output from filter 52 is fed along lead line 54 to the input at pin 31 of a digital volt meter device 56 (See FIG. 3). Volt meter device 56 is a conventional 40-pin one chip digital volt meter, such as an ICL 7117. Volt meter device 56, as is known, has adjustments for circuit gain, zero and reference to enable a direct display of load values in desired engineering units, such as inch-pounds, foot-pounds, tons-per-hour, horsepower, etc., which are proportional to the load cell output.

Display device 58 is a conventional seven segment LED device, with six alphanumeric indicators and one polarity indicator. Of course, any equivalent LCD or LED devices or the like may be used. The six alphanumeric output cells are directly driven by the one chip digital volt meter device 56, as clearly illustrated by the connections shown in FIG. 3. Device 56 also functions as an analog-to-digital converter so that filtered analog load voltages input thereto from lead line 54 are converted from their analog form to a digital form for processing in volt meter device 56. Device 56 subsequently drives display 58 to produce an output indicative of the analog input signals on lead line 54. FIG. 3 further illustrates exemplary external connections to source voltages and passive elements (resistors, etc.) to establish a working embodiment of device 56. The completed embodiment is for example only, and is not intended as limiting to this invention.

Referring back to FIG. 2, the output of operational amplifier 38 (pre-amplifier means 12) is also fed in parallel with operational amplifiers 48 and 50 to operational amplifier 60, which functions as the polarity detector of FIG. 1. Operational amplifier 60 drives a transistor 62, which is in turn associated with the polarity indicator portion of display 58. See input P4 of display 58. Hence, polarity detector 60 receives its input directly from the non-conditioned amplified load cell output. Detector 60 then directly drives an indicator means display 58(P4), the control of which is completely separated from the signal level display portion thereof, even though the polarity and voltage level displays are contained within only a single actual display device 58 in this particular embodiment. Device 58 functionally constitutes two separately driven displays (such as 20 and 30 of FIG. 1), and of course, the two separately driven displays could be physically separated from each other if desired and still remain within the scope of this invention.

Volt meter device 56 indicates only positive voltages due to the prior rectification of signals on its input lead line 54 by operational amps 48 and 50. Therefore, volt meter 56 is easily able to display fluctuating signals with a stable display because it does not have to contend with the changing polarity aspect of such signals. Changing polarities are more accurately monitored by such a multi-staged approach because the polarity detection decisions are made based on nonconditioned signals, which have not had their sharp polarity changes by any filter networks or smoothing networks. Therefore, the overall display 58 provides both highly accurate polarity information and filtered steady state load voltage information.

Digital display 58, in addition to having its input pre-calibrated for desired units by volt meter 56, may also have its decimal points selectable by the actuation of external switches. Additionally, the number of trailing zeros may also be selectable by other switches. None of such external or other switches are specifically illustrated in FIGS. 2 or 3 inasmuch as they are well known and understood by one of ordinary skill in the art based simply on the foregoing disclosure.

As illustrated in FIG. 1, the output of precision rectifier 18 is fed in parallel to two different stages. The stage associated with selectable filter network 26 and volt meter 28 has been discussed above. The other parallel branch from precision rectifier 18 concerns limit detector and alarm drive 22.

In FIG. 2, operational amplifier 64 and its associated components are one example of such a limit detector. The limit value of limit detector 64 is established by the variable resistor 66. An established limit value keeps an alarm drive output of limit detector 64 cutoff until the input from the precision rectifier arrangement of operational amplifiers 48 and 50 equals the established limit value.

Capacitor 68 constitutes an integrating feedback path for operational amplifier 64 so that the input from precision rectifier means 18 of FIG. 1 is integrated over time. Such an integration feedback feature prevents nuisance limit trip outs during minor overloads because minor overloads do not integrate over a short period of time to a value which exceeds the selected limit value. Instead, minor overloads require a longer integration time to overcome a selected limit value. Limit detector 22 is simultaneously responsive much faster to large overloads because such larger overloads require a much shorter integration time than small overloads to overcome the selected limit value. Therefore, the piece of mechanical equipment actually associated with the present indicator device is very quickly protected by a fast trip out of limit detector 22 whenever large overloads are detected, while at the same time nuisance trip outs caused by low level or minor overloads are avoided.

To enable highest accuracy while setting a selectable limit value, a limit display push button 70 when actuated connects the limit setting potentiometer 66 to the volt meter 56 input, thereby enabling display of the limit setting. In other words, the analog voltage level established by potentiometer 66 is fed upon actuation of push button switch 70 via line 55 to the input of volt meter 56, which in turn shows on display 58 the voltage level (limit value) set by potentiometer 66. The usual input from precision rectifier 18 along lead line 54 to volt meter 56 is interrupted by switch 70 during display of the limit value, as understood from viewing the connections of switch 70 illustrated in FIGS. 2 and 3.

As illustrated in FIG. 1, limit detector 22 has also associated therewith an alarm drive, and a subsequent latchable alarm 24 with relay control and auto reset. In FIG. 3, transistors 72 and 74 form a bi-stable circuit which is responsive to the output of operational amplifier 64 along lead line 76 to latch an overload trip condition whenever an alarm mode switch 78 is set in its LATCH (L) position. If the alarm mode switch 78 is set in its RESET mode (i.e., switch 78 thrown to its R pole), transistors 72 and 74 automatically reset whenever an overload input condition is relieved. Actuation in the LATCH mode (i.e., switch 78 thrown to its L pole) "freezes" the current output of display 58 so as to indicate the precise load value at the time of alarm trip out. Indication of such a latch condition to volt meter device 56 is made via the output from alarm mode switch 78 at resistor 80 to the pin 1 input of volt meter device 56, as illustrated in FIG. 3. Both the alarm and the display return to normal whenever they are manually reset.

A relay 82 is also associated with alarm circuit 24 by connection with the emitter and base of transistors 72 and 74, respectively. Alarm activation at overload energizes relay 82 to provide a contact opening (or closure, as selected) to perform desired functions such as activating external devices or shutting down an associated mechanical system. A disable switch 84 locks out such a function of relay 82 whenever a normal overload is expected, such as during a startup sequence of the machinery or other similar period.

Figure 4:
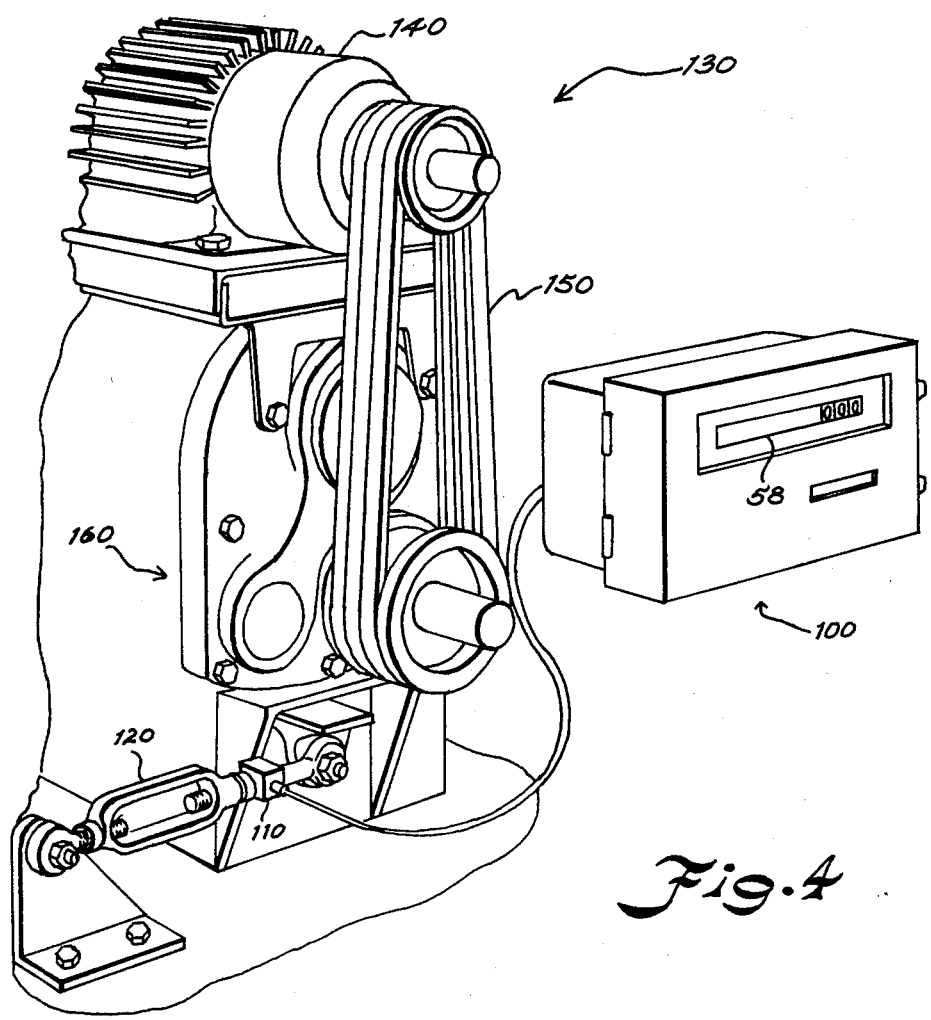
FIG. 4 is a schematic representation of the relationship between an indicator device in accordance with this invention, a typical load cell and a conventional torque arm speed reducer.

FIG. 4 illustrates a typical indicator device in accordance with this invention applied to a mechanical data environment exemplified by a torque arm speed reducer. Such an indicator device 100 having a display 58 may receive input from a conventional load cell. Such a load cell may comprise a strain guage such as illustrated by element 110 mounted on a restraining arm 120. Restraining arm 120 may typically be housed within or on a torque arm speed reducer 130. Hence, the load cell 110 outputs data concerning the mechanical tension and compression in arm or rod 120 of a torque arm speed reducer 130. Such a reducer typically may comprise an electric drive motor 140 for driving a belt 150, which in turn drives a geared speed reducer 160.

Many modifications and variations of the numerous features of the present invention will occur to one of ordinary skill in the art. For example, various circuit arrangements in place of operational amplifiers 48 and 50 might be used as a precision rectifier arrangement. Alternatively, different volt meter chips or driven displays may be used, or the functions of single chip device 56 may be performed by a plurality of separate elements. The entire indicator apparatus may be packaged in a single desired enclosure, with many of the indicated controls (such as limit display switch 70, limit setting potentiometer 66, and the like), placed conveniently on a front panel of the enclosure. Other internal-type set-ups which are less often used, such as the system initialization calibration switches, might then be included inside the enclosure so as to not clutter a front panel control area. Any and all such modifications and variations which would occur to one of ordinary skill in the art are intended to be included within the spirit and scope of the present invention.

In spirit, the present invention concerns a number of useful features, such as (but not limited to): built-in resistor calibration, a separate monitor output signal, load signal rectifier, digital readout display, separate load polarity indictions, adjustable limit trip point, limit readout on digital monitor, limit integrator, limit latch mode and limit bypass. Hence, the true spirit of the present invention is intended to encompass any and all various combinations of such features and other recited above in the specification which one of ordinary skill in the art might select for use with his or her particular application, the scope of this invention being limited only by the appended claims.

What is claimed is:

1. An apparatus of multiple, generally separate stages for processing input data comprising mechanical-deformation data from a load cell comprising a strain guage, said apparatus comprsing:
   pre-amplifier means for receiving and amplifying said data generally without otherwise conditioning same;
   rectifier means, separate from said pre-amplifier means, for rectifying said amplified data;
   meter means, responsive to said rectified, amplified data, for outputting and displaying an absolute signal level indication thereof, and
   polarity indicator means, responsive to said amplified generally non-conditioned data which has a substantially wide bandwidth, for outputting and displaying a polarity indication thereof, whereby absolute signal level and relatively high-frequency polarity indications are separately and accurately provided.

2. An apparatus as in claim 1, wherein said pre-amplifier means also outputs a relatively wide bandwidth monitor level output, with output signals from said monitor output being unconditioned so as to permit accurate tracking of transient occurrences in said input data.

3. An apparatus as in claim 1 wherein said pre-amplifier means includes means for separately adjusting the gain and zero offset thereof.

4. An apparatus as in claim 1 wherein said pre-amplifier means includes a built-in resistor calibrator for calibrating said meter means and said polarity indicator means.

5. An apparatus as in claim 1, further comprising filter means, interposed between said rectifier means and said meter means, for smoothing said rectified, amplified data and outputting the same as steady state data, wherein said meter means is responsive to said rectified, amplified data in said steady state data form.

6. An apparatus as in claim 5 wherein said filter means includes both selectable resistive and capacitive values, selection of which establishes a filter time constant for said filter means.

7. An apparatus of multiple, generally separate stages for processing input data, comprsing:
   pre-amplifier means for receiving and amplifying said data generally without other wise conditioning same;
   rectifier means, separate from said pre-amplifier means, for rectifying said amplified data;
   meter means, responsive to said rectified, amplified data, for outputting and displaying an absolute signal level indication thereof; and
   polarity indicator means, responsive to said amplified generally non-conditioned data which has a substantially wide bandwidth, for outputting and displaying a polarity indication thereof, whereby absolute signal level and relatively high-frequency polarity indications are separately and accurrately provided; wherein
   said meter means comprises a single chip digital voltmeter including an analog to digital data converter and including means for internal adjustment.

8. An apparatus as in claim 7, wherein said input data comprises mechanical-deformation data from a load cell comprising a strain gauge.

9. An apparatus of multiple, generally separate stages for processing input data, comprising:

pre-amplifier means for receiving and amplifying said data generally without otherwise conditioning same;

rectifier means, separate from said pre-amplifier means, for rectifying said amplified data;

meter means, responsive to said rectified, amplified data, for outputting and displaying an absolute signal level indication theroef; and polarity indicator means, responsive to said amplified generally non-conditioned data whioh has a substantially wide bandwidth, for outputting and displaying a polarity indication thereof, whereby absolute signal level and relatively high-frequency polarity indications are separately and accurately provided; wherein said rectifier means comprises a pair of parallel operational amplifiers for performing precision rectification of said amplified data.

10. An apparatus of multiple, generally separate stages for processing input signals, comprising:
a pre-amplifier for receiving and ampifying said input signals generally without otherwise conditioning same;
a rectifier for rectifying said amplified signals;
a meter device, responsive to said rectified, amplified signals, for outputting and displaying an absolute signal level indication thereof;
a polarity indicator, responsive to said amplified generally non-conditioned signals which have a substantially wide bandwidth, for outputting and displaying a polarity indication thereof; and
a limit detector and alarm drive, responsive to said rectified, amplified signals, for comparing the level of signals input thereto with a selectable limit value, and for producing an alarm output whenever said limit value is exceeded, said alarm drive also being adapted for setting said selectable limit value.

11. An apparatus as in claim 10 wherein said limit detector and alarm drive includes a feedback intergration loop for integrating said signals input thereto to prevent nuisance alarm outputs caused by minor relatively short-term excesses over said limit value while enabling relatively quick response to relatively larger excesses.

12. An apparatus as in claim 10 further including a latchable alarm, responsive to said alarm output of said alarm drive, for holding and displaying through said meter device the value of said signals input to said alarm drive whenever said alarm output is produced.

13. An apparatus as in claim 12, wherein said latchable alarm includes a relay control for opening and closing a relay associated therewith in response to the presence and absence, respectively, of said alarm output, and said latchable alarm further includes a manual reset button which when actuated releases and clears said displayed value.

14. An apparatus as in claim 13, further including a disable device for selectively preventing said relay control from responding to said alarm output.

15. A multi-stage indicator device for monitoring loads in a mechanical system, comprising:
an input for receiving data from a conventional load cell associated with said mechanical system;
a pre-amplifier stage for amplifying said input and outputting the same;
a monitor level output comprising a direct connection with said pre-amplifier stage output;
a polarity indicator stage, responsive to said pre-amplifier stage output, for indicating the polarity of said data, the changing polarity of which being indicative of alternating compression and tension in said mechanical system;
a precision rectifier stage for rectifying said pre-amplifier stage output and outputting the same; and
a voltmeter stage, responsive to said rectifier stage output, for detecting and displaying absolute values of said data; wherein accurate detection and display of absolute data values and alternating polarities thereof is separately but simultaneously achieved in parallel operative stages.

16. A device as in claim 15, further including an over-limit detection stage, responsive to said rectifier stage output, for integrating the analog value of said data input thereto and outputting an alarm signal if a selectable limit value is exceeded.

17. A device as claim 15, further comprising a filter stage interposed between said rectifier stage and voltmeter stage for smoothing the analog data input to said voltmeter stage.

18. A device as in claim 15, further including an excitation input adapted to be applied to said conventional load cell for generating said data.

19. An apparatus for processing input data, comprising generally separate stages, including:
pre-amplifier means for receiving and amplifying said data generally without otherwise conditioning same;
rectifier means for rectifying said amplified data;
meter means, responsive to said rectified, amplified data, for outputting and displaying an absolute signal level indication thereof; and
polarity indicator means, responsive to said amplified data which has a relatively wide bandwidth, for outputting and displaying a polarity indication thereof; wherein
said pre-amplifier means also separately outputs a relatively wide bandwidth monitor level output which is also unconditioned so as to permit accurate tracking of transcient occurrences in said input data.

20. An apparatus for processing input data, comprising:
pre-amplifier means for receiving and amplifying said data;
rectifier means for rectifying said amplified data;
meter means, responsive to said rectiified, amplified data, for outputting and displaying an absolute signal level indication thereof; and
polarity indicator means, responsive to said amplified data, for outputting and displaying a polarity indication thereof; wherein
said input data comprises mechanical-deformation data from a load cell comprising a strain gauge; said load cell is incorporated into housing restraining rods of a torque arm gear reducer; and
the output of said polarity indicator means is indicative of alternating compression and tension in said restraining rods.

21. An apparatus for processing input signals, comprising:
a pre-amplifier for receiving and amplifying said input signals;
a rectifier for rectifying said amplified signals;

a meter device, responsive to said rectified, amplified signals, for outputting and displaying an absolute signal level indication thereof;
a polarity indicator, responsive to said amplified signals, for outputting and displaying a polarity indication thereof; and
a limit detector and alarm drive, responsive to said rectified, amplified signals, for comparing the level of signals input thereto with a selectable limit value, and for producing an alarm output wherever said limit value is exceeded, said alarm drive also being adapted for setting said selectable limit value; wherein
said alarm drive selectively displays the selected limit value through said meter device.

* * * * *